May 23, 1933.　　　　W. PRUSSING　　　　1,910,713
TUBE ADVANCING AND MOUNTING MECHANISM

Original Filed July 25, 1928　　　2 Sheets-Sheet 1

INVENTOR
Walter Prussing
BY
ATTORNEY

Patented May 23, 1933

1,910,713

UNITED STATES PATENT OFFICE

WALTER PRUSSING, OF BROOKLYN, NEW YORK, ASSIGNOR TO VICTOR METAL PRODUCTS CORPORATION, OF BROOKLYN, NEW YORK, A CORPORATION OF NEW YORK

TUBE ADVANCING AND MOUNTING MECHANISM

Original application filed July 25, 1928, Serial No. 295,332. Divided and this application filed December 31, 1931. Serial No. 584,048.

This application is a division of my application for patent for Method and mechanism for making collapsible tubes, Serial No. 295,332, filed January 25th, 1928, which has matured into Patent 1,839,438 dated Jan. 5, 1932.

This invention relates to machines for operating upon thin and easily deformable collapsible tubes for transferring said tubes automatically from one point or support therefor to another, and from one mechanism to another. My invention is applicable to all types of collapsible tubes, whether made with "ribbon" or round openings, or whether said tubes have had caps mounted thereon or not.

My invention contemplates the provision of means for automatically moving the tubes about for enamelling, drying and printing, whereby handling and manual transfer thereof are eliminated, so that the tubes are not subjected to danger of deformation and the labor and risks of handling are greatly reduced.

The various objects of my invention will appear from the description which follows and from the drawings, in which, Fig. 1 is a top view of the mechanism for removing the tube automatically from the conveyor and for transferring the tube to the printing mechanism.

It will be understood that my improved mechanism may be used in connection with various machines for operating upon tubes, but that in the form illustrated, said mechanism is designed for the purpose of automatically removing a tube from a conveyor and mounting it on a printing machine where the tube is printed, then removing the tube from the printer to a second conveyor on which the tube is finally dried and carried to the inspector for inspection and packing. While on the conveyor, various operations may be performed on the tube such as drying, etc.

In that practical embodiment of my invention which I have illustrated in connection with enamelling, printing and drying mechanism, the enamelling mechanism has been designated generally by numeral 10, and the tube conveyor designated generally by numeral 11.

Figure 3:
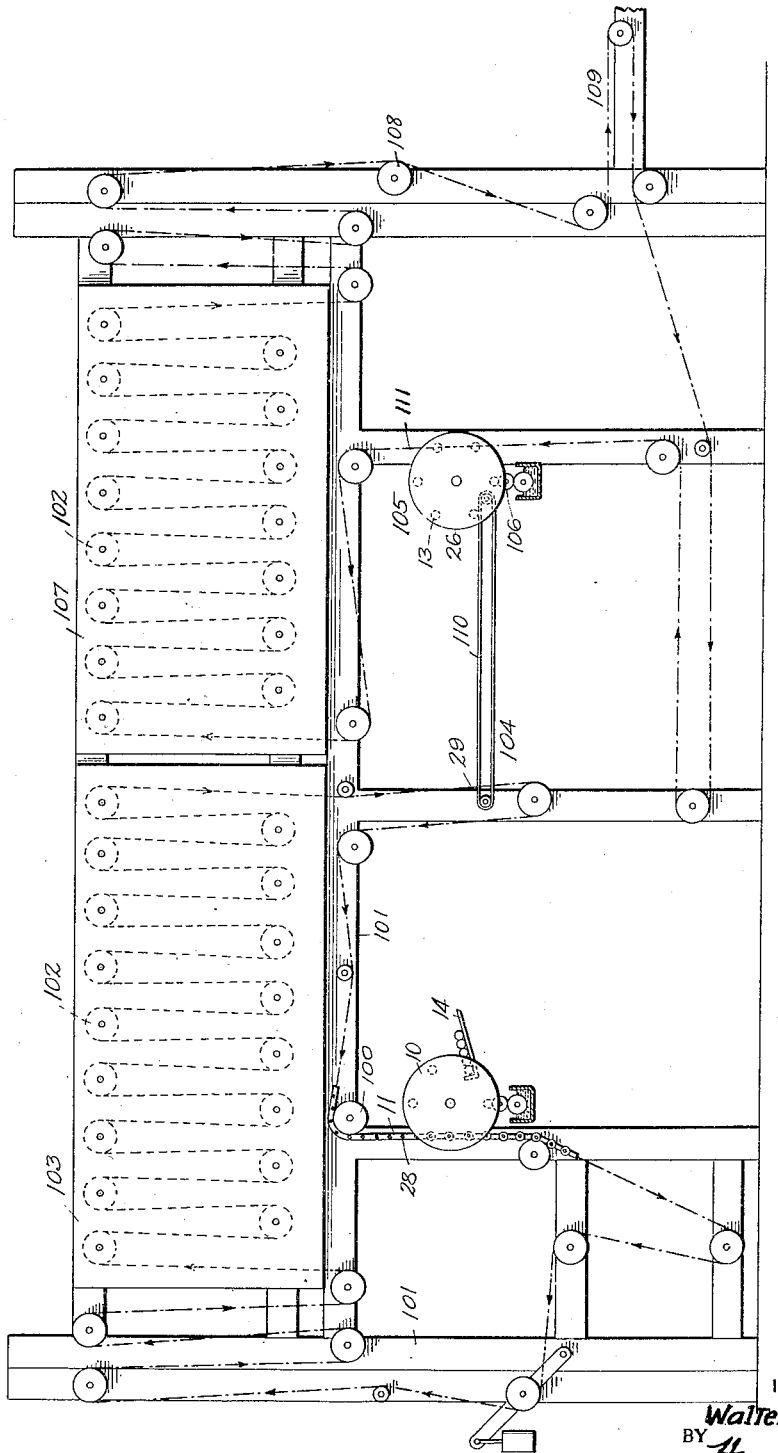
Fig. 3 is a diagrammatic front view of the mechanism designed to carry out my improved method.

Referring to Fig. 3, I have there shown diagrammatically, the mechanism for mounting the tubes automatically on the mandrel of the enameller 10. Said mechanism includes a chute or runway 14 to which the tubes are fed so that the necks thereof face away from the mandrel, said mechanism being fully described in my co-pending application for patent for Method and mechanism for making collapsible tubes, Serial No. 295,332, filed July 25th, 1928. No further description thereof is deemed necessary. It need merely be said that the machanism transfers the enamelled tubes to the pins 28 of the conveyor chain 29.

Said conveyor 11 is guided in its movement by suitable pulleys 100 supported on the frame 101 (Fig. 3). On the upper part of the frame 101, the conveyor chain is passed over a plurality of rather closely spaced pulleys 102 so that the tubes, after being enamelled, are caused to travel over a quite considerable linear distance. Said pulleys 102 and the conveyor chain are substantially enclosed in a suitable box 103 to which heated air may be supplied in any well known manner for drying the enamelled tubes until said tubes are in condition for printing. That is, the tubes are dried until they are "tacky" or sufficiently adhesive to retain printing ink applied during the printing operation.

It will be understood that the conveyor chain is driven at the proper speed and the temperature of the heated air properly regulated to so dry the tubes than on the emergence of the chain from the box 103 as at the printing station 104, the tubes are in the proper condition to be printed.

The printing mechanism, designated generally by the numeral 105, is much similar to the enamelling mechanism 10 so that a detailed description thereof is unnecessary.

It need merely be said that the printer includes an intermittently rotatable face plate 26 on which the spaced mandrels 13 are arranged, said mandrels being halted in proper position to have a tube mounted thereon by mechanism which withdraws the tube from the chain 29. The face plate 26 is again halted so that the tube mounted on the mandrel may be printed by the printing roller 106 after which the face plate is again halted in position to allow a transfer mechanism to remove the printed tube from the mandrel and deposit said tube on one of the pins 28 of the conveyor chain 111. Said chain is run about pulleys 102 arranged similarly to the pulleys 102 previously referred to, and enclosed in the drying box 107. The chain 111 carries the printed tubes for a sufficient time to allow thorough drying of said tubes after which the chain is carried about suitable pulleys as 108 to the inspection and packing station indicated at 109 where the tubes may be inspected, removed from the conveyor chain, if desired, and packed. If uncapped tubes are operated upon, the capping of the tubes may be readily performed at the inspection and packing station 109.

The mechanism for removing the enamelled tube from the chain 11 at the printing station 104 and for mounting said tube on the mandrel 13 of the printer 105 will now be described.

It is desirable to arrange the printer in such a position that the tubes may be readily dismounted therefrom and discharged on to the conveyor chain 29. I prefer to provide an endless belt as 110 on which the tubes may be deposited in spaced relation by said transfer mechanism and carried by said belt into position to be properly mounted upon the printer. Said belt is suitably supported upon the rollers 112, one or both of which may be continuously rotated through any suitable means connected to the shaft 113. Bearings as 114 upstanding from the table 115 serve to support said rollers and said shaft. For engaging the rear open end of a tube on one of the pins 28 of the conveyor 11, I prefer to provide a slide 116 having an upstanding projection or hook end 117, said slide being suitably supported in a bearing as 118. That end of said slide opposite to the end 117 is suitably connected as by a slot and pin connection 121, to an oscillatory lever 119 pivoted to the table 115 as at 120. Said lever is oscillated by a suitable means such as the link 122 connected to the lever as at 123 and reciprocated by any suitable means not shown such as a crank, cam or the equivalent thereof.

Figure 1:
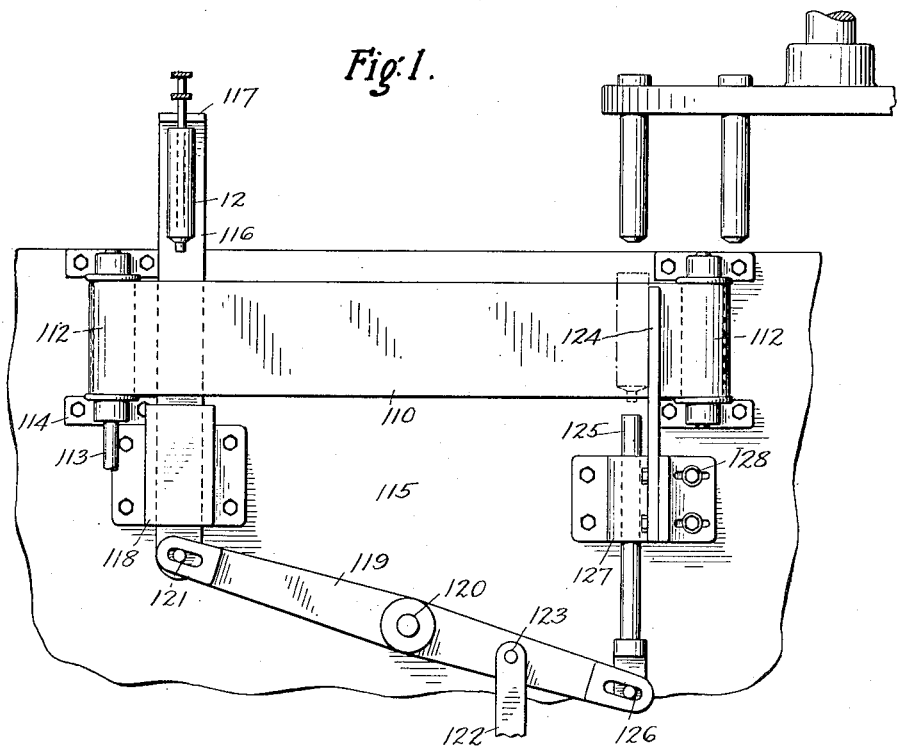
Figure 2:
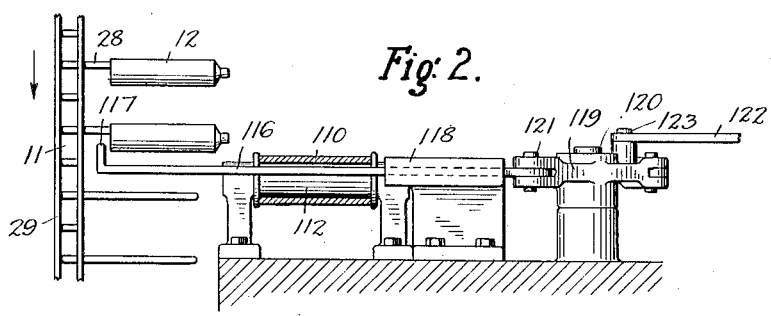
Fig. 2 is a front view and partial vertical section of the same.

The movement of the chain 29 and of the lever 119 are so synchronized that the projection or hook 117 is temporarily at rest behind the open end of the tube 12 on said chain as the tube reaches the dismounting position wherein it may be engaged by said projection 117. As the tube is brought by the chain into such position, the lever 119 is swung about its pivot 120, whereby the projection 117 is brought forward (Figs. 1 and 2) and pushes the tube off the pin 28 on to the belt 110. The lever 119 is then swung back, bringing the projection 117 into position to remove the next tube at the proper time. It will be understood that the belt 110 is moved with sufficient speed to maintain the various dismounted tubes deposited thereon, in spaced relation, so that said tubes do not come in contact or stick together due to the "tacky" condition of the enamel thereon. The belt carries the tube rapidly up against the stop 124 which aligns the tube in proper position to be mounted on the mandrel 13 by the pusher rod 125.

Said rod has a slot and pin connection 126 with the lever 119 and is supported in the bearing 127 secured to the table 115. Suitable screws as 128 serve to secure the stop 124 to the table 115 so that said stop may be adjusted to align tubes varying in size into proper position for mounting.

It will be seen that as the lever 119 is oscillated by the link 122, a tube is removed from the conveyor chain 11 while a second leading tube on the belt, held stationary temporarily by the stop 124, is carried off the belt and mounted on the mandrel 13 by the reciprocation of the rod 125 at the other end of said lever, and before the next tube on the belt can touch the halted leading tube.

After the tubes have been printed by the printing roller 106, said tubes are removed from the mandrel by means substantially identical with that mentioned in connection with the enameller 10 and disclosed in my said copending application Serial No. 295,332, so that the tubes are deposited on the pins 28 of the conveyor chain 111. The tubes are then carried through the drier box 107 and there dried and are then carried into the inspection and packing station 109 where the tubes may be inspected, removed from the conveyor, and packed.

It will be seen that I have provided simple and efficient mechanism for transferring frail, collapsible tubes for the various operations thereon and that said mechanism may be used for transferring tubes for various types of operations during the manufacture of said tubes. While I have shown and described specific embodiments of my invention, I do not intend to be understood as limiting myself to the structure herein shown and described since I intend to claim my invention as broadly as may be permitted by the state of the prior art and the terms of the appended claims.

I claim:

1. In a machine for operating upon thin collapsible tubes each having an open end, a conveyor chain, spaced parallel pins projecting from said chain at substantially right angles to the direction of movement of the chain, and adapted to carry tubes thereon, a mandrel in spaced relation and parallel to said pins, and means for removing tubes from the pins and for mounting the tubes successively on the mandrel comprising a reciprocatory arm, a member at one end of said arm adapted to engage the open end of the tube carried by a pin and to move the tube away from and off the pin on the reciprocation of said arm, a reciprocatory rod arranged coaxially of the mandrel, a belt arranged to move from the arm toward and past the rod, a stop adjacent the belt, said belt being adapted to receive the tubes dismounted from the pins and to carry said tubes successively against the stop and in coaxial alignment with the rod and the mandrel, and means for reciprocating the arm and the rod for simultaneously transferring a tube from the pin to the belt and for transfering another tube from the belt to the mandrel.

2. In a machine for operating upon thin collapsible tubes, a conveyor chain adapted to have the tubes loosely mounted thereon, a mandrel in spaced relation to the chain, and means for removing a tube from the chain and for mounting the tube on the mandrel comprising a reciprocatory tube dismounting member, a movable belt arranged to receive a dismounted tube and to advance the tube toward the mandrel, a stop in the path of the advancing tube arranged to halt the tube momentarily in an aligned position coaxially of the mandrel, and a reciprocatory rod adapted to engage the aligned tube to push the halted tube toward and on to the mandrel.

3. In a machine for operating upon thin collapsible tubes each having an open end, a conveyor chain, spaced parallel pins on the chain each adapted to fit loosely into a tube and to carry the tube in substantially horizontal suspended position, a reciprocatory dismounting member adapted to engage the open end of a tube carried by a pin to dismount the tube axially of the pin when the pin reaches the dismounting position, a belt arranged below and forwardly of the dismounting position to receive the tubes dismounted from said pins, to maintain and to forward said tubes in spaced relation, and means for forwarding said belt in a direction at substantially right angles to the axes of the pins to maintain the axes of the tubes horizontal and transverse to the direction of the movement of the belt.

4. In a machine for operating upon thin collapsible tubes, a series of parallel, substantially horizontal pins movable in succession into tube-dismounting position and each adapted to enter the open end of a tube to suspend and advance the tube toward dismounting position, a belt adjacent the dismounting position of said pins, means for dismounting the tubes successively from said pins and on to said belt as each of the pins reaches dismounting position, and means for continuously moving said belt whereby the tubes on the belt are arranged in spaced relation and out of contact with each other.

5. In a machine for operating upon thin collapsible tubes, a movable tube-suspending and advancing pin, a mandrel parallel to and spaced from the pin, and means for removing the tube from the pin and for mounting the tube on the mandrel including a tube-carrying belt movable from the pin toward the mandrel, and a stop arranged in the path of the tube carried by the belt for aligning the tube coaxially with the mandrel.

6. In a machine for operating upon thin collapsible tubes, a member for loosely supporting a tube, a mandrel adapted to support a tube, and arranged in spaced relation to said member, means adapted to engage the rear end of a tube on said member for dismounting the tube from said member, means for advancing the dismounted tube toward the mandrel, means in the path of the advancing tube for aligning the tube with the mandrel, and a reciprocatory rod adapted to engage the closed end of the tube for pushing the aligned tube toward and on to the mandrel.

7. In a machine for operating upon thin collapsible tubes, a conveyor chain, spaced tube-supporting pins on the chain adapted to suspend and advance the tubes into dismounting position, a mandrel spaced from the dismounting position of said pins, a reciprocatory hook arm adapted to engage the rear end of a tube on the pin when the pin reaches dismounting position and to move the tube forwardly to dismount it from the pin, a travelling belt movable from the pin toward the mandrel and adapted to receive the tubes successively dismounted from the pins and to move between dismounting operations to space said tubes apart on the belt, means in the path of the tubes carried by the belt for aligning the leading tube coaxially of the mandrel, and a reciprocatory rod adapted to engage the neck end of the aligned tube to push said tube off the belt and on to the mandrel.

8. In a machine for operating upon thin collapsible tubes, tube-supporting and advancing means, a tube dismounting member provided with a projection at the operative end thereof, a tube mounting rod, a mandrel, and means for operatively connecting said member and said rod for moving said member and rod in opposite directions simultaneously whereby a tube is dismounted by said member from said supporting means while another tube is simultaneously mounted by the rod on to the mandrel.

9. In a machine for operating upon thin collapsible tubes, a movable tube supporting pin, and means for dismounting the tube from the pin during the movement thereof comprising a reciprocatory member provided with a projection, and means for arranging the projection behind the open end of the tube as the pin approaches said member and for moving said projection axially of and away from the pin when the pin has carried the tube into the path of said projection.

10. In a machine for operating upon thin collapsible tubes, a movable tube supporting pin, and means for pushing upon the open end of the tube and for dismounting the tube from the pin comprising a reciprocatory member, a projection on said member, means for moving said projection axially of and away from the pin when the pin has carried the tube into the path of said projection, and a travelling belt movable in a direction at substantially right angles to the axis of the pin for receiving the tube dismounted by said projection and for advancing the tube.

11. In a machine for operating upon thin collapsible tubes, a conveyor chain, spaced tube supporting pins on said chain, a travelling belt, means for intermittently dismounting tubes from said pins and on to said belt for advancing said tubes in spaced relation, means in the path of the tubes advanced by the belt for aligning the leading tube on the belt, and means for moving the tube axially and off said belt while the tube is aligned and before the next tube has been carried by said belt into contact with the aligned tube.

12. In a machine for operating upon thin collapsible tubes, a conveyor chain adapted to support and to advance tubes, means for dismounting the tubes successively from said chain, means for advancing the dismounted tubes in spaced relation, means for temporarily halting and aligning a dismounted tube, a mandrel, and means for removing the aligned tube from the advancing means and for mounting said tube on the mandrel.

13. In a machine for transferring thin collapsible tubes, flexible tube advancing means including spaced pins for suspending the tubes in substantially horizontal position, reciprocatory means for dismounting a tube from the pins, means for receiving and further advancing the dismounted tube, and means for mounting the tube, dismounted by said reciprocatory means, on said further advancing means.

14. In a machine for operating upon thin collapsible tubes, a conveyor chain, a substantially horizontal tube suspending pin projecting from the chain and adapted to receive a wet enamelled tube and to advance said tube, means for drying the tube while on the pin, a mandrel, and means for removing the dried enamelled tube from the pin and for mounting the tube upon the mandrel comprising a horizontally reciprocatory tube-dismounting arm, a continuously moving belt adapted to receive and to advance the dismounted tube toward the mandrel, and a reciprocatory member adapted to remove the tube from the belt and to mount said tube on the mandrel.

15. In a machine for operating upon thin collapsible tubes, means for advancing a wet enamelled tube including a conveyor chain, a heater compartment enclosing part of the chain and adapted to dry the advancing enamelled tube, means for dismounting the tube from the chain, a belt adjacent the dismounting means for receiving and further advancing the tube, spaced mandrels, and means for removing the tube from the belt and for mounting the tube on to one of the mandrels including means for aligning the tube.

16. In a machine for operating upon thin collapsible tubes, means for advancing a wet enamelled tube, means for drying the tube, means for removing the dried tube from the advancing means, means for further advancing the removed tube, means for aligning the dried tube, a mandrel, and means for mounting the aligned tube on the mandrel.

17. In a machine for operating upon thin collapsible tubes, a conveyor chain, spaced substantially horizontal pins on said chain each adapted to enter the open end of a tube for horizontally suspending and advancing the tube, means for drying the tube while suspended from one of said pins, means for dismounting tubes successively from the pins, means for advancing the dismounted tubes in spaced relation, means for halting and aligning the leading tube so advanced, a mandrel, and means for mounting the aligned tube on the mandrel.

18. In a machine for operating upon thin collapsible tubes, means for advancing and drying a wet enamelled tube, means for removing the dried tube from the advancing means, means for further advancing the tube, means for aligning the tube, a tube support adjacent the aligning means, and means for re-mounting the aligned tube on the support.

19. The method of making collapsible tubes without manual handling comprising enamelling a series of tubes successively, then suspending and advancing the enamelled tubes while wet for a predetermined period and simultaneously drying them by heat, further advancing the dried tubes in greater spaced relation than during their first advance and at a higher speed, halting the leading tube for such a time as to avoid interference with the succeeding tubes, printing the tubes successively while they rotate and are otherwise at rest and then again drying the printed tubes while simultaneously advancing them.

20. The method of making thin metal collapsible tubes without manual handling comprising enamelling a series of tubes successively, automatically advancing and drying the enamelled tubes while wet, transferring the tubes automatically into position for printing, printing the tubes after the drying operation and advancing the tubes while subjecting them to heat for a sufficient time to dry them.

WALTER PRUSSING.